United States Patent
Keyes et al.

(10) Patent No.: US 6,439,784 B1
(45) Date of Patent: Aug. 27, 2002

(54) METHOD AND SYSTEM FOR USING CALIBRATION PATCHES IN ELECTRONIC FILM PROCESSING

(75) Inventors: Michael P. Keyes, Round Rock; Philip E. Cannata, Austin, both of TX (US)

(73) Assignee: Applied Science Fiction, Inc., Austin, TX (US)

( * ) Notice: Subject to any disclaimer, the term of this patent is extended or adjusted under 35 U.S.C. 154(b) by 0 days.

(21) Appl. No.: 09/640,853

(22) Filed: Aug. 17, 2000

Related U.S. Application Data
(60) Provisional application No. 60/149,261, filed on Aug. 17, 1999, provisional application No. 60/173,789, filed on Dec. 30, 1999, provisional application No. 60/179,942, filed on Feb. 3, 2000, and provisional application No. 60/180,106, filed on Feb. 3, 2000.

(51) Int. Cl.⁷ .......................... G03D 5/00; G03B 27/52
(52) U.S. Cl. .................. 396/564; 396/567; 355/27; 355/38; 358/487; 358/527
(58) Field of Search ................ 396/567–570, 396/578, 604, 564; 355/38, 27–29, 77; 358/471, 506, 527, 487; 430/30

(56) References Cited

U.S. PATENT DOCUMENTS

| | | | |
|---|---|---|---|
| 2,404,138 A | 7/1946 | Mayer | 95/94 |
| 3,520,689 A | 7/1970 | Nagae et al. | 96/55 |
| 3,520,690 A | 7/1970 | Nagae et al. | 96/55 |
| 3,587,435 A | 6/1971 | Chioffe | 95/89 |

(List continued on next page.)

FOREIGN PATENT DOCUMENTS

| | | | |
|---|---|---|---|
| EP | 0 261 782 A2 | 8/1987 | H04N/1/46 |
| EP | 0 422 220 A1 | 3/1989 | A61B/6/03 |
| EP | 0 482 790 B1 | 9/1991 | H04N/1/40 |
| EP | 0 525 886 A3 | 7/1992 | G03D/5/00 |

(List continued on next page.)

OTHER PUBLICATIONS

"Adaptive Fourier Threshold Filtering: A Method to Reduce Noise and Incoherent Artifacts in High Resolution Cardiac Images", Doyle, M., et al., 8306 Magnetic Resonance in Medicine 31, No. 5, Baltimore, MD, May, pp. 546–550, 1994.

(List continued on next page.)

*Primary Examiner*—D. Rutledge
(74) *Attorney, Agent, or Firm*—Dinsmore & Shohl LLP

(57) ABSTRACT

A method and system (100) for using reference patches (108) to enhance electronic film processing of a scene image (104) contained on a first area of a film (112) include creating a reference patch (108) on a second area of the film (112); coating the film (112) with a developing solution to form a scene image (104) and a patch image (108); scanning the film (112) coated with the developing solution to generate signals corresponding to digital representations of the scene image (104) and the patch image (108); calculating image processing parameters from the signals associated with the patch image (108); and processing the digital representations of the scene image (104) using the image processing parameters calculated from the patch image (108) to produce color values which more accurately reflect the original scene and which are pleasing to the eye.

20 Claims, 2 Drawing Sheets

U.S. PATENT DOCUMENTS

| | | | |
|---|---|---|---|
| 3,615,479 A | 10/1971 | Kohler et al. | 96/48 |
| 3,615,498 A | 10/1971 | Aral | 96/55 |
| 3,617,282 A | 11/1971 | Bard | 96/59 |
| 3,747,120 A | 7/1973 | Stemme | 346/75 |
| 3,833,161 A | 9/1974 | Krumbein | 226/92 |
| 3,903,541 A | 9/1975 | Von Meister et al. | 354/317 |
| 3,946,398 A | 3/1976 | Kyser et al. | 346/1 |
| 3,959,048 A | 5/1976 | Stanfield et al. | 156/94 |
| 4,026,756 A | 5/1977 | Stanfield et al. | 156/554 |
| 4,081,577 A | 3/1978 | Horner | 427/424 |
| 4,142,107 A | 2/1979 | Hatzakis et al. | 250/571 |
| 4,215,927 A | 8/1980 | Grant et al. | 354/317 |
| 4,249,985 A | 2/1981 | Stanfield | 156/554 |
| 4,265,545 A | 5/1981 | Slaker | 356/431 |
| 4,301,469 A | 11/1981 | Modeen et al. | 358/75 |
| 4,490,729 A | 12/1984 | Clark et al. | 346/75 |
| 4,501,480 A | 2/1985 | Matsui et al. | 354/298 |
| 4,564,280 A | 1/1986 | Fukuda | 354/317 |
| 4,594,598 A | 6/1986 | Iwagami | 346/140 |
| 4,621,037 A | 11/1986 | Kanda et al. | 430/30 |
| 4,623,236 A | 11/1986 | Stella | 354/318 |
| 4,633,300 A | 12/1986 | Sakai | 358/41 |
| 4,636,808 A | 1/1987 | Herron | 346/75 |
| 4,666,307 A | 5/1987 | Matsumoto et al. | 356/404 |
| 4,670,779 A | 6/1987 | Nagano | 358/75 |
| 4,736,221 A | 4/1988 | Shidara | 354/317 |
| 4,741,621 A | 5/1988 | Taft et al. | 356/376 |
| 4,745,040 A | 5/1988 | Levine | 430/21 |
| 4,755,844 A | 7/1988 | Tsuchiya et al. | 354/317 |
| 4,777,102 A | 10/1988 | Levine | 430/21 |
| 4,796,061 A | 1/1989 | Ikeda et al. | 355/73 |
| 4,814,630 A | 3/1989 | Lim | 250/578 |
| 4,821,114 A | 4/1989 | Gebhardt | 358/75 |
| 4,845,551 A | 7/1989 | Matsumoto | 358/80 |
| 4,851,311 A | 7/1989 | Millis et al. | 430/30 |
| 4,857,430 A | 8/1989 | Millis et al. | 430/30 |
| 4,875,067 A | 10/1989 | Kanzaki et al. | 354/325 |
| 4,969,045 A | 11/1990 | Haruki et al. | 358/228 |
| 4,994,918 A | 2/1991 | Lingemann | 358/214 |
| 5,027,146 A | 6/1991 | Manico et al. | 354/299 |
| 5,034,767 A | 7/1991 | Netz et al. | 354/317 |
| 5,101,286 A | 3/1992 | Patton | 358/487 |
| 5,124,216 A | 6/1992 | Giapis et al. | 430/30 |
| 5,155,596 A | 10/1992 | Kurtz et al. | 358/214 |
| 5,196,285 A | 3/1993 | Thomson | 430/30 |
| 5,200,817 A | 4/1993 | Birnbaum | 358/80 |
| 5,212,512 A | 5/1993 | Shiota | 354/319 |
| 5,231,439 A | 7/1993 | Takahashi et al. | 354/313 |
| 5,235,352 A | 8/1993 | Pies et al. | 346/140 |
| 5,255,408 A | 10/1993 | Blackman | 15/308 |
| 5,266,805 A | 11/1993 | Edgar | 250/330 |
| 5,267,030 A | 11/1993 | Giorgianni et al. | 358/527 |
| 5,292,605 A | 3/1994 | Thomson | 430/30 |
| 5,296,923 A | 3/1994 | Hung | 358/527 |
| 5,334,247 A | 8/1994 | Columbus et al. | 118/411 |
| 5,350,651 A | 9/1994 | Evans et al. | 430/21 |
| 5,350,664 A | 9/1994 | Simons | 430/362 |
| 5,357,307 A | 10/1994 | Glanville et al. | 354/324 |
| 5,360,701 A | 11/1994 | Elton et al. | 430/501 |
| 5,371,542 A | 12/1994 | Pauli et al. | 348/262 |
| 5,391,443 A | 2/1995 | Simons et al. | 430/21 |
| 5,414,779 A | 5/1995 | Mitch | 382/199 |
| 5,416,550 A | 5/1995 | Skye et al. | 354/298 |
| 5,418,119 A | 5/1995 | Simons | 430/507 |
| 5,418,597 A | 5/1995 | Lahcanski et al. | 355/76 |
| 5,432,579 A | 7/1995 | Tokuda | 354/293 |
| 5,436,738 A | 7/1995 | Manico | 358/503 |
| 5,440,365 A | 8/1995 | Gates et al. | 354/298 |
| 5,447,811 A | 9/1995 | Buhr et al. | 430/20 |
| 5,448,380 A | 9/1995 | Park | 358/520 |
| 5,452,018 A | 9/1995 | Capitant et al. | 348/651 |
| 5,465,155 A | 11/1995 | Edgar | 358/500 |
| 5,477,345 A | 12/1995 | Tse | 358/500 |
| 5,496,669 A | 3/1996 | Pforr et al. | 430/22 |
| 5,516,608 A | 5/1996 | Hobbs et al. | 430/30 |
| 5,519,510 A * | 5/1996 | Edgar | 358/471 |
| 5,546,477 A | 8/1996 | Knowles et al. | 382/242 |
| 5,550,566 A | 8/1996 | Hodgson et al. | 345/202 |
| 5,552,904 A | 9/1996 | Ryoo et al. | 358/518 |
| 5,563,717 A * | 10/1996 | Koeng et al. | 358/406 |
| 5,568,270 A | 10/1996 | Endo | 358/298 |
| 5,576,836 A | 11/1996 | Sano et al. | 358/302 |
| 5,581,376 A | 12/1996 | Harrington | 358/518 |
| 5,587,752 A | 12/1996 | Petruchik | 396/315 |
| 5,596,415 A | 1/1997 | Cosgrove et al. | 358/296 |
| 5,627,016 A | 5/1997 | Manico | 430/434 |
| 5,649,260 A * | 7/1997 | Wheeler et al. | 396/569 |
| 5,664,253 A | 9/1997 | Meyers | 396/603 |
| 5,664,255 A | 9/1997 | Wen | 396/627 |
| 5,667,944 A * | 9/1997 | Reem et al. | 430/30 |
| 5,678,116 A | 10/1997 | Sugimoto et al. | 396/611 |
| 5,691,118 A | 11/1997 | Haye | 430/357 |
| 5,695,914 A | 12/1997 | Simon et al. | 430/379 |
| 5,698,382 A | 12/1997 | Nakahanada et al. | 430/418 |
| 5,726,773 A | 3/1998 | Mehlo et al. | 358/474 |
| 5,739,897 A | 4/1998 | Frick et al. | 355/40 |
| 5,771,107 A | 6/1998 | Fujimoto et al. | 358/464 |
| 5,790,277 A | 8/1998 | Edgar | 358/487 |
| 5,835,795 A | 11/1998 | Craig et al. | 396/6 |
| 5,835,811 A | 11/1998 | Tsumura | 396/598 |
| 5,870,172 A | 2/1999 | Blume | 355/27 |
| 5,880,819 A | 3/1999 | Tanaka et al. | 355/75 |
| 5,892,595 A | 4/1999 | Yamakawa et al. | 358/530 |
| 5,930,388 A | 7/1999 | Murakami et al. | 382/167 |
| 5,959,720 A * | 9/1999 | Kwon et al. | 355/38 |
| 5,963,662 A | 10/1999 | Vachtsevanos et al. | 382/150 |
| 5,966,465 A | 10/1999 | Keith et al. | 382/232 |
| 5,979,011 A | 11/1999 | Miyawaki et al. | 15/308 |
| 5,982,936 A | 11/1999 | Tucker et al. | 382/233 |
| 5,982,937 A | 11/1999 | Accad | 382/239 |
| 5,982,941 A | 11/1999 | Loveridge et al. | 382/260 |
| 5,982,951 A | 11/1999 | Katayama et al. | 382/284 |
| 5,988,896 A | 11/1999 | Edgar | 396/604 |
| 5,991,444 A | 11/1999 | Burt et al. | 382/232 |
| 5,998,109 A | 12/1999 | Hirabayashi | 430/434 |
| 6,000,284 A | 12/1999 | Shin et al. | 73/150 |
| 6,005,987 A | 12/1999 | Nakamura et al. | 382/294 |
| 6,017,688 A * | 1/2000 | Edgar | 430/470 |
| 6,065,824 A | 5/2000 | Bullock et al. | 347/19 |
| 6,069,714 A | 5/2000 | Edgar | 358/487 |
| 6,088,084 A | 7/2000 | Nishio | 355/75 |
| 6,089,687 A | 7/2000 | Helterline | 347/7 |
| 6,097,471 A * | 8/2000 | Buhr et al. | 355/38 |
| 6,101,273 A | 8/2000 | Matama | 382/169 |
| 6,102,508 A | 8/2000 | Cowger | 347/7 |
| 6,137,965 A | 10/2000 | Burgeios et al. | 396/626 |
| 6,200,738 B1 | 3/2001 | Takano et al. | 430/362 |

FOREIGN PATENT DOCUMENTS

| | | | | |
|---|---|---|---|---|
| EP | 0 580 293 A1 | 6/1993 | | H04N/1/04 |
| EP | 0 580 293 A1 | 1/1994 | | H04N/1/04 |
| EP | 0 601 364 A1 | 6/1994 | | H04N/1/387 |
| EP | 0 669 753 A2 | 2/1995 | | H04N/1/407 |
| EP | 0 794 454 A2 | 2/1997 | | G03B/27/73 |
| EP | 0 768 571 A2 | 4/1997 | | G03D/13/00 |
| EP | 0 806 861 A1 | 11/1997 | | H04N/1/00 |
| EP | 0 878 777 A2 | 11/1998 | | G06T/5/40 |
| EP | 0 930 498 A2 | 12/1998 | | G01N/21/88 |
| WO | WO 90/01240 | 2/1990 | | H04N/1/40 |
| WO | WO 91/09493 | 6/1991 | | H04N/5/217 |
| WO | WO 97/25652 | 7/1997 | | G03D/5/00 |

| | | | |
|---|---|---|---|
| WO | WO 98/19216 | 5/1998 | ............ G03C/5/29 |
| WO | WO 98/25399 | 6/1998 | ............ H04N/1/38 |
| WO | WO 98/31142 | 7/1998 | .......... H04N/5/253 |
| WO | WO 93/34157 | 8/1998 | |
| WO | WO 98/34157 | 8/1998 | |
| WO | WO 98/34397 | 8/1998 | |
| WO | WO 99/43148 | 8/1999 | ............ H04N/1/00 |
| WO | WO 99/43149 | 8/1999 | .......... H04N/1/100 |
| WO | WO 01/01197 | 1/2001 | ............ G03D/5/00 |
| WO | WO 01/13174 A1 | 2/2001 | ............ G03D/5/06 |
| WO | WO 01/45042 A1 | 6/2001 | ............ G06T/5/00 |
| WO | WO 01/50192 A1 | 7/2001 | .......... G03C/7/407 |
| WO | WO 01/50193 A1 | 7/2001 | .......... G03C/7/407 |
| WO | WO 01/50194 A1 | 7/2001 | .......... G03C/7/407 |
| WO | WO 01/50197 A1 | 7/2001 | ............ G03C/7/42 |
| WO | WO 01/52556 A2 | 7/2001 | ............ H04N/9/11 |

OTHER PUBLICATIONS

"Anisotropic Spectral Magnitude Estimation Filters for Noise Reduction and Image Enhancement", Aich, T., et al., Philips GmbH Research Laboratories, IEEE, pp. 335–338, 1996.

"Adaptive–neighborhood filtering of images corrupted by signal–dependent noise", Rangayyan, R., et al., Applied Optics, vol. 37, No. 20, pp. 4477–4487, July 10, 1998.

"Grayscale Characteristics", The Nature of Color Images, Photographic Negatives, pp. 163–168.

"Parallel Production of Oligonucleotide Arrays Using Membranes and Reagent Jet Printing", Stimpson, D., et al., Research Reports, BioTechniques, vol. 25, No. 5, pp. 886–890, 1998.

"Low–Cost Display Assembly and Interconnect Using Ink–Jet Printing Technology", Hayes, D. et al., Display Works '99, MicroFab Technologies, Inc., pp. 1–4, 1999.

"Ink–Jet Based Fluid Microdispensing in Biochemical Applications", Wallace, D., MicroFab Technologies, Inc., Laboratory Automation News, vol. 1, No. 5, pp. 6–9, Nov., 1996.

"Protorealistic Ink–Jet Printing Through Dynamic Spot Size Control", Wallace, D., Journal of Imaging Science and Technology, vol. 40, No. 5, pp. 390–395, Sep./Oct. 1996.

"MicroJet Printing of Solder and Polymers for Multi–Chip Modules and Chip–Scale Package", Hayes, D., et al., MicroFab Technologies, Inc.

"A Method of Characteristics Model of a Drop–on–Demand Ink–Jet Device Using an Integral Method Drop Formation Model", Wallace, D., MicroFab Technologies, Inc., The American Society of Mechanical Engineers, Winter Annual Meeting, pp. 1–9, Dec. 10–15, 1989.

"Digital Imaging Equipment White Papers", Putting Damaged Film on ICE, www.nikonusa.com/reference/whitepapers/imaging, Nikon Corporation, Nov. 28, 2000.

* cited by examiner

METHOD AND SYSTEM FOR USING CALIBRATION PATCHES IN ELECTRONIC FILM PROCESSING

This application claims the benefit of U.S. Provisional Application Nos. 60/149,261, filed on Aug. 17, 1999; 60/173,789, filed on Dec. 30, 1999; 60/179,942, filed on Feb. 3, 2000; and 60/180,106, filed on Feb. 3, 2000.

TECHNICAL FIELD

This invention relates generally to electronic film processing, and more particularly to a method and system for using calibration patches in electronic film processing.

BACKGROUND OF THE INVENTION

Conventional color photographic film generally contains three superimposed color sensing layers. Each layer contains a light sensitive material, typically silver halide, that is spectrally sensitive to a specific portion of the visible light spectrum. In general, the top layer responds primarily to light of short wavelength (blue light), the middle layer responds primarily to light of medium wavelength (green light) and the bottom layer responds to light of long wavelength (red light). When film with these types of spectral sensitivities is exposed to visible light, each spot on the film records the intensity of blue, green and red light incident on that location of the film. This film record of incident light referred to as the latent image.

In conventional color photographic development systems, the exposed film is chemically processed to produce color dyes in the three layers with color densities directly proportional to the blue, green and red light intensities recorded as the latent image. Conventional chemical film processing involves the application of a number of processing solutions to the film to produce the color dyes. A developer solution is first applied to the exposed film. In a chemical reaction, the developer solution interacts with the silver halide and couplers in the film to produce elemental silver particles and a respective color dye. The development process is halted at the proper exposure by rinsing the developer solution off the film or a stop solution to the film. A fixing solution is then applied to the film to convert the unexposed silver halide to elemental silver. A bleaching solution is then applied to the film to rinse away the elemental silver and leave the color dyes in each layer. Additional processing solutions can be applied to the film as required to preserve the film. The film is then dried and forms a conventional film negative. Through a conventional printing process, the film negative can be used to produce positive prints of the film negative. The film negative can also be electronically scanned to produce a digital image.

Image enhancement has been the subject of a large body of film processing technology. In particular, color correction is a specific area of image enhancement that is particularly problematic. One difficulty with color correction is trying to correct colors that are incorrect without changing the true colors of the pictured scene.

SUMMARY OF THE INVENTION

Briefly summarized, the present invention provides a method for using a calibration patch to electronically process exposed film. In one application, the film is exposed to a calibration light source that creates a reference patch. Developer solution is then applied to the film. The film is then electronically scanned without removing the developer solution to produce an electronic image and an electronic reference image. The electronic reference image is then used to calculate processing parameters for the electronic image. In a particular application, the electronic scanning process comprises electronically scanning the silver metal particles in the film. In another application, the electronic scanning process comprises electronically scanning the dyes in the film. In yet another application, the electronic scanning process comprises a combination of the above.

In another application of the present invention, a method for using a calibration patch in a electronic film processing system is provided. In this application, an unexposed area of the film is exposed to a calibration signal to create a reference patch. The film is then developed to form scene images composed of silver metal particles. Signals corresponding to digital representations of scans of the scene image and the reference patch are generated. Image processing parameters from the signals associated with the reference patch are calculated and used in processing the signals of the digital representations corresponding to the scene image. The image processing parameters then produce initial color values which more accurately reflect the original scene and which are pleasing to the eye.

The invention also provides an improved scanning device used to process a developed scene image on a film according to the present invention. The scanning device comprises a number of optic sensors, an electromagnetic energy source and computer processor. The optic sensors generate digital representations of the scene image and a reference patch image. The computer processor uses the digital representations to calculate image processing parameters based on the reference patch to produce improved color values for the digital representations of the scene image.

The various features and characteristics of the present invention will become more apparent when taken in conjunction with the drawings and the following description wherein like referenced numerals represent like parts.

DETAILED DESCRIPTION

The method of the present invention involves exposing undeveloped film to a calibration light source to produce a reference patch. A developer solution is applied to the film to develop the film. The film is electronically scanned without removing the developer solution. In one embodiment, as described herein, the film is electronically scanned using a duplex scanning method whereby the elemental silver in the film is scanned. Duplex scanning generally utilizes two electromagnetic radiation sources, with one positioned in front and one in back of the film. The radiation from these sources is attenuated by the amount of silver metal particles at each spot on the film. The attenuated radiation is detected and converted to digital signals using appropriate optical and electronic systems. Based on the amount of detected radiation, one embodiment of the present invention produces four values, referred to as front, back, front-through and back-through data, for each pixel on the film. These signals are directly related to the silver metal particles that form the scene image.

Figure 1:
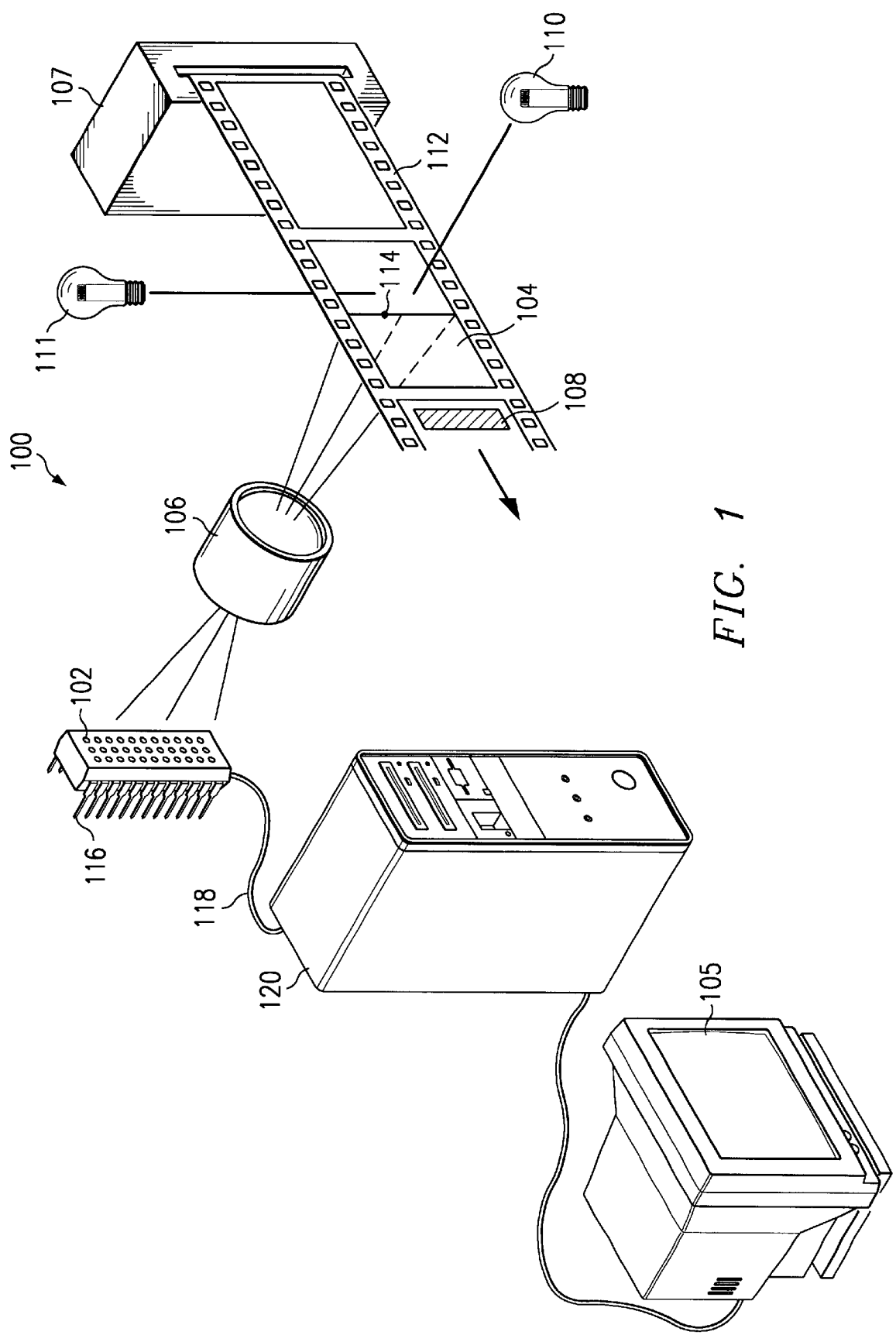
FIG. 1 is a perspective view of a scanning device in accordance with the present invention.

An improved digital film scanning apparatus 100, which includes a calibration exposure device 107 is shown in FIG. 1. The digital film scanning apparatus 100 may in turn be part of a larger optical and electronic system. The scanning apparatus 100 operates by converting electromagnetic radiation from an image to an electronic (digital) representation of the image. The image being scanned is typically embodied in a physical form, such as on a photographic media, i.e., film, although other media may be used. The electromagnetic radiation used to convert the image into a digitized representation is infrared light; however, visible light, microwave and other suitable types of electromagnetic radiation may also be used to produce the digitized image.

One embodiment of a duplex scanning apparatus 100, as illustrated in FIG. 1, is used to illustrate the present invention and its operation. It will be understood that other suitable embodiments of scanning apparatus 100 may be employed without departing from the scope of the present invention. For example, another embodiment, the scanning apparatus 100 operates to scan the film through the developer using visible light to detect color dyes in the film. In another embodiment, the scanning apparatus 100 utilizes a combination of visible light detection of the color dyes and duplex imaging, as described in detail below, to measure the metallic silver particles in the film.

The scanning apparatus 100 generally includes a number of optic sensors 102. In the embodiment illustrated, the optic sensors 102 measure the intensity of electromagnetic energy passing through and/or reflected by the film 112. The source of electromagnetic energy is typically a light source 110 which illuminates the film 112 containing the scene image 104 and the reference patch image 108 to be scanned. Radiation from the source 110 may be diffused or directed by additional optics such as filters (not shown) and one or more lenses 106 positioned near the sensors 102 and the film 114 in order to illuminate the images 104 and 108 more uniformly. Furthermore, more than one source may be used. Source 110 is positioned on the side of the film 112 opposite the optic sensors 102. This placement results in sensors 102 detecting radiation emitted from source 110 as it passes through the images 104 and 108 on the film 112. Another radiation source 111 is shown placed on the same side of the film 112 as the sensors 102. When source 111 is activated, sensors 102 detect radiation reflected by the images 104 and 108. This process of using two sources positioned on opposite sides of the film being scanned is described in more detail below in conjunction with FIG. 2.

The optic sensors 102 are generally geometrically positioned in arrays such that the electromagnetic energy striking each optical sensor 102 corresponds to a distinct location 114 in the images 104 and 108. Accordingly, each distinct location 114 in the scene image 104 corresponds to a distinct location, referred to as a picture element, or "pixel" for short, in the scanned, or digitized image 105. The images 104 and 108 on film 112 are usually sequentially moved, or scanned, across the optical sensor array 102. The optical sensors 102 are typically housed in a circuit package 116 which is electrically connected, such as by cable 118, to supporting electronics for computer data storage and processing, shown together as computer 120. Computer 120 can then process the digitized image 105. Alternatively, computer 120 can be replaced with a microprocessor and cable 118 replaced with an electrical circuit connection.

Optical sensors 102 may be manufactured from different materials and by different processes to detect electromagnetic radiation in varying parts and bandwidths of the electromagnetic spectrum. The optical sensor 102 comprises a photodetector (not expressly shown) that produces an electrical signal proportional to the intensity of electromagnetic energy striking the photodetector. Accordingly, the photodetector measures the intensity of electromagnetic radiation attenuated by the images 104 and 108 on film 112.

Figure 2:
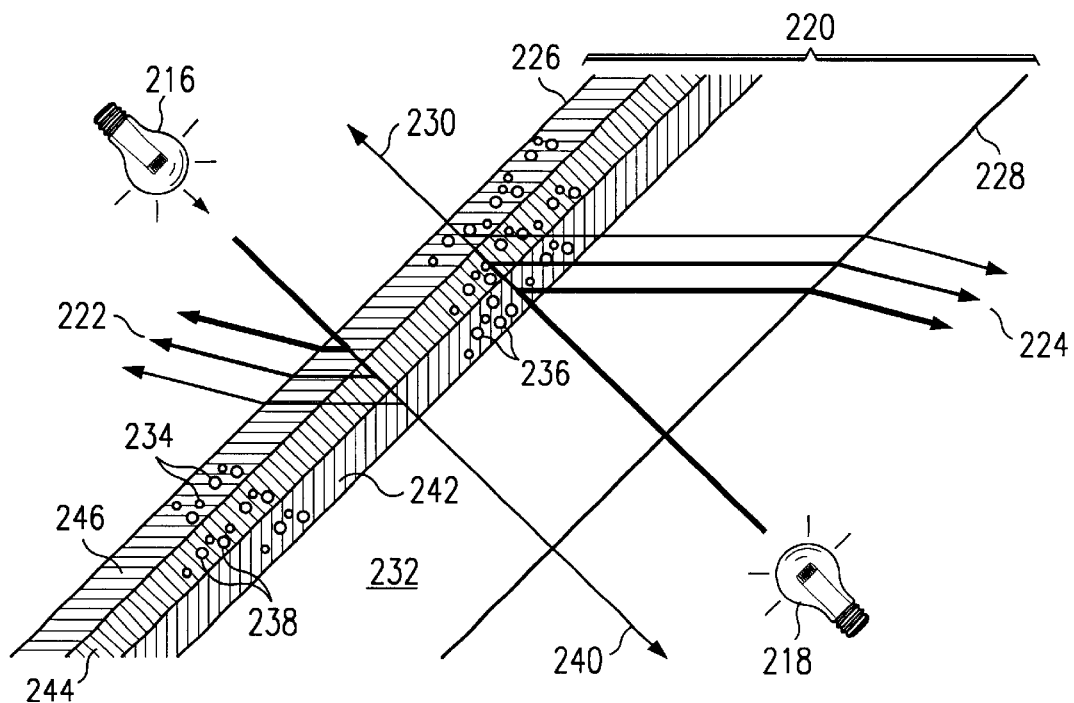
FIG. 2 is an illustration of a duplex film processing system in accordance with the present invention.

Turning now to FIG. 2, a conventional color film 220 is depicted. As previously described, one embodiment of the present invention uses duplex film scanning which refers to using a front source 216 and a back source 218 to scan a film 220 with reflected radiation 222 from the front 226 and reflected radiation 224 from the back 228 of the film 220 and by transmitted radiation 230 and 240 that passes through all layers of the film 220. While the sources 216, 218 may emit polychromatic light, i.e., multi-frequency light, the sources 216, 218 are generally monochromatic and preferably infrared. The respective scans, referred to herein as front, back, front-through and back-through, are further described below.

In FIG. 2, separate color levels are viewable within the film 220 during development of the red layer 242, green layer 244 and blue layer 246. Over a clear film base 232 are three layers 242, 244, 246 sensitive separately to red, green and blue light, respectively. These layers are not physically the colors; rather, they are sensitive to these colors. In conventional color film development, the blue sensitive layer 246 would eventually develop a yellow dye, the green sensitive layer 244 a magenta dye, and the red sensitive layer 242 a cyan dye.

During development, layers 242, 244, and 246 are opalescent. Dark silver grains 234 developing in the top layer 246, the blue source layer, are visible from the front 226 of the film, and slightly visible from the back 228 because of the bulk of the opalescent emulsion. Similarly, grains 236 in the bottom layer 242, the red sensitive layer, are visible from the back 228 by reflected radiation 224, but are much less visible from the front 226. Grains 238 in the middle layer 244, the green sensitive layer, are only slightly visible to reflected radiation 222, 224 from the front 226 or the back 228. However, they are visible along with those in the other layers by transmitted radiation 230 and 240. By sensing radiation reflected from the front 226 and the back 228 as well as radiation transmitted through the film 220 from both the front 226 and back 228 of the film, each pixel for the film 220 yields four measured values, one from each scan, that may be mathematically processed in a variety of ways to produce the initial three colors, red, green and blue, closest to the original scene.

The front signal records the radiation 222 reflected from the illumination source 216 in front of the film 220. The set of front signals for an image is called the front channel. The front channel principally, but not entirely, records the attenuation in the radiation from the source 216 due to the silver metal particles 234 in the top-most layer 246, which is the blue recording layer. There is also some attenuation of the front channel due to silver metal particles 236, 238 in the red and green layers 242, 244.

The back signal records the radiation 224 reflected from the illumination source 218 in back of the film 220. The set of back signals for an image is called the back channel. The back channel principally, but not entirely, records the attenuation in the radiation from the source 218 due to the silver metal particles 236 in the bottom-most layer 242, which is the red recording layer. Additionally, there is some attenuation of the back channel due to silver metal particles 234, 238 in the blue and green layers 246, 244.

The front-through signal records the radiation 230 that is transmitted through the film 220 from the illumination source 218 in back of the film 220. The set of front-through signals for an image is called the front-through channel. Likewise, the back-through signal records the radiation 240 that is transmitted through the film 220 from the source 216 in front of the film 220. The set of back-through signals for an image is called the back-through channel. Both through channels record essentially the same image information since they both record the attenuation of the radiation 230, 240 due to the silver metal particles 234, 236, 238 in all three red, green, and blue recording layers 242, 244, 246 of the film 220.

Several image processing steps are required to convert the illumination source radiation information for each channel to the red, green, and blue values similar to those produced by conventional scanners for each spot on the film 220. These steps are required because the silver metal particles 234, 236, 238 that form during the development process are not spectrally unique in each of the film layers 242, 244, 246. These image processing steps are not performed when conventional scanners are used because the dyes which are formed with conventional chemical color processing of the film make each film layer spectrally unique. However, just as with conventional scanners, once initial red, green and blue values are derived for each image, further processing of the red, green, and blue values is usually done to produce images that more accurately reproduce the original scene and that are pleasing to the human eye.

Figure 3:
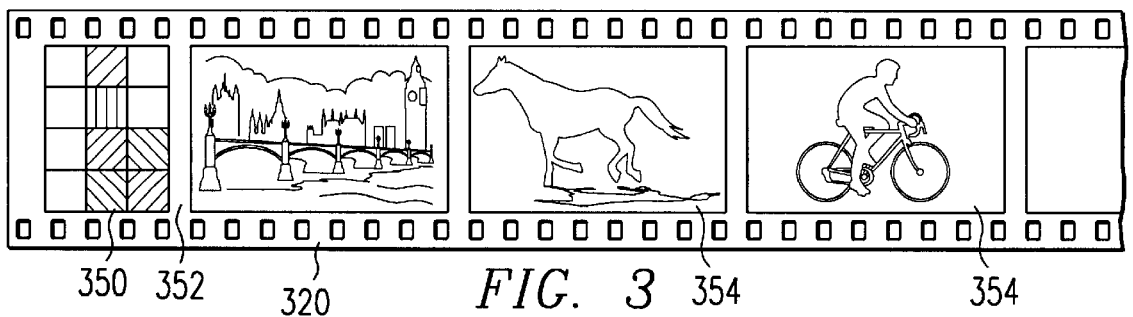
FIG. 3 is a plan view of film containing scene images and reference patches according to the present invention.

As described in connection with FIG. 1, the scanning apparatus 100 may include a calibration exposure device 107 that produces a calibration, or reference patch 350 in an unexposed area 352 of the photographic film 320, as illustrated in FIG. 3. This step is typically performed by the calibration exposure device 107; however, the reference patch 350 may be formed before or during scene exposure. After scene exposure and reference patch creation, the film 320 is chemically processed, and the attenuation of radiation by the silver metal particles in the area 352 where the reference patches 350 were created is measured. The measured reference patch attenuation is used to calculate image processing parameter values that are used to digitally process the front, back and through channels collected for the scene image 354 to produce appropriate initial red, green and blue values.

Thus, one implementation of the present invention involves the following process. After a roll of film has been exposed to light to form scene images 354, reference patches 350 are created on the photographic film 320 in an unexposed area of the film 320. As mentioned previously, this step is preferably done at the time of chemical development and film scanning. The reference patches 350 may be either a gray scale or colored, such as red, green, or blue. Likewise, the reference patches 350 may consist of both gray scale and colored patches. The reference patch 350 exposures and spectral properties are accurately known by either design or by direct measurement. Then, the front, back, front-through, and back-through signals from each of the reference patches 350 and from each of the scene images 354 are measured. As discussed in greater detail below, the image processing parameters which are used to produce the initial red, green and blue values for the scene images 354 from the signals corresponding to those scene images 354 are derived from the front, back, front-through, and back-through signals corresponding to the reference patches 350. Finally, the front, back, front-through, and back-through channel data for the scene images 354 are processed to produce appropriate initial red, green and blue values using the image processing parameters that were calculated from the reference patches 350.

Next, some possible image processing functions which may be used according to the present invention to produce initial color values from the image processing parameters are discussed. One function that uses the reference patch data taught by the present invention is known as the Regress-to-Through-Channel ("RTC") function. Basically, for each pixel corresponding to each of the four channels, the pixel's color values are adjusted such that gray pixels have exactly the same value in each channel. One implementation for performing Regress-to-Through-Channel image processing is as follows. First, the front, back, and through (either the front-through or the back-through channel may be used) signals from the reference gray patches are read. Next, two plots are made, one being the through channel mean values for each gray reference patch versus the front channel mean values. The second plot is the through channel mean values for each gray reference patch versus the back channel mean values. Then, an equation is fit to each plot. Any equation type or algorithm could be used, although a cubic equation is preferred. For each pixel in the front channel for the entire scene image, a new front value is calculated based on the equation that was fit to the through-versus-front plot. Likewise, for each pixel in the back channel for the entire scene image, a new back value is calculated based on the equation fit to the through-versus-back plot. Manipulating the pixel data in this way has the effect of producing better grays than prior art systems and separating non-gray pixels from gray pixels.

A second image processing function that may make use of the reference patch data is a stretch function. In general, values in the front, back, and through (either the front-through or the back-through channel may be used) channels are adjusted such that they have the same range as an aim signal. The aim signal is defined as that set of signals that the calibration patches are designed to give. That is, there is an aim signal for each patch that directly corresponds to the exposure used to generate that patch. Specifically, the process begins by reading the through channel signals from reference gray patches placed on the film. Then, a plot is made of the aim values of the gray patches versus the through channel means for each gray reference patch. Next, a best-fit equation is calculated for the plot. While a linear equation is preferred, any best-fit equation may be used. The best-fit equation is then applied to every pixel in the front, back, and through channel data for the entire scene image to give new pixel values in each of the channels. Use of the stretch function produces good blacks and whites in the scene image reproductions.

Yet another image processing function involves calculating a color correction mapping based on gray and color calibration patches, and applying the color correction mapping to the entire scene image. First, all pixel values from the calibration patches and the entire scene image are converted to a suitable color space. Second, a color correction mapping is calculated between the mean values obtained for each calibration patch and the corresponding aim values for each patch. The calculation method may assume that the color correction mapping is linear or non-linear, and it may be implemented as a regression technique or by other methods. One example is to calculate a color correction mapping by applying a linear regression resulting in a 3×3 matrix. Third, the color correction mapping is applied to every pixel in the entire scene image. The result is that the scene image is a more accurate representation of the color in the original scene than without the color correction mapping applied.

It is intended that the description of the present invention provided above is but one embodiment for implementing the invention. Variations in the description likely to be conceived of by those skilled in the art still fall within the breadth and scope of the disclosure of the present invention. For example, although the technique of the present invention has been described in the context of its application to standard color film, another option is to use a film built specifically for this purpose. The film would require no color couplers as a color image never develops. While specific alternatives to steps of the invention have been described herein, additional alternatives not specifically disclosed but known in the art are intended to fall within the scope of the invention. Thus, it is understood that other applications of the present invention will be apparent to those skilled in the art upon the reading of the described embodiment and a consideration of the appended claims and drawings.

We claim:

1. A method for electronically processing exposed undeveloped film using a reference patch, the method comprising:

exposing the film to a calibration light source to create a reference patch;

coating a developer solution onto the film;

electronically scanning the coated film to produce an electronic image and an electronic reference image;

calculating processing parameters using the electronic reference image; and processing the electronic image using the processing parameters to produce initial color values.

2. The method of claim 1, wherein the step of scanning the coated film comprises electronically scanning a dye image in the coated film to produce an electronic image and an electronic reference image.

3. The method of claim 1, wherein the step of scanning the coated film comprises electronically scanning a latent silver image in the coated film to produce an electronic image and an electronic reference image.

4. The method of claim 1, wherein the step of scanning the coated film comprises electronically scanning a latent silver image and a dye image in the coated film to produce an electronic image and an electronic reference image.

5. The method of claim 1, wherein the step of calculating processing parameters using the electronic reference image comprises defining a color correction map using the electronic reference image and a standard.

6. The method of claim 1, wherein the reference patch comprises a gray scale reference patch.

7. The method of claim 1, wherein the step of electronically scanning the coated film comprises electronically scanning the coated film using infrared light to produce an electronic image and an electronic reference image.

8. The method of claim 1, wherein the step of electronically scanning the coated film comprises electronically scanning the coated film using white light to produce an electronic image and an electronic reference image.

9. The method of claim 1, wherein the step of electronically scanning the coated film comprises electronically scanning the film using front, back, front-through and back-through imaging.

10. The method of claim 9, wherein the step of calculating processing parameters using the electronic reference image comprises:

plotting through channel mean values for the electronic reference image versus front channel mean values to form a first plot;

plotting through channel mean values for the electronic reference image versus back channel mean values to form a second plot;

determining a first equation which best fits the first plot;

determining a second equation which best fits the second plot;

calculating a new data value for each pixel in the front imaging signal based on the first equation; and calculating a new data value for each pixel in the back imaging signal based on the second equation.

11. The method of claim 10 wherein the first and second equations are cubic equations.

12. An electronic film processing system for processing exposed undeveloped film, comprising:

a calibration light source operable to create a reference patch on the film;

an applicator operable to apply a film processing solution to the film;

at least one imaging station operable to scan the coated film and produce an electronic image of a scene and the reference patch; and a computer processor coupled to the at least one imaging station, wherein the electronic image of the reference patch is used in calculating image processing parameters that are used to process the electronic image of the scene to produce initial color values.

13. The electronic film processing system of claim 12, wherein the applicator comprises at least one slot coater device.

14. The electronic film processing system of claim 12, wherein the at least one imaging station comprises:

a light source operable to illuminate the film; and a sensor system operable to detect metallic silver particles in the film.

15. The electronic film processing system of claim 12, wherein the at least one imaging station comprises:

a light source operable to illuminate the film; and a sensor system operable to detect color dyes in the film.

16. The electronic film processing system of claim 12, wherein the at least one imaging station comprises:

a first imaging station comprising:
        a first light source operable to illuminate the film; and
        a first sensor system operable to detect metallic silver particles in the film; and a second imaging station comprising:
        a second light source operable to illuminate the film; and
        a second sensor system operable to detect color dyes in the film.

17. A scene image prepared in accordance with the following steps:

providing a film with a latent scene image on a first area of the film;

creating at least one reference patch having known spectral properties on a second area of the film;

applying a developer solution to the film;

developing the coated film to form a scene image and developed reference patch images;

scanning the coated film to generate signals corresponding to digital representations of the developed scene image and the developed patch images;

calculating image processing parameters from the signals associated with the developed patch images; and processing the digital representations of the developed scene image using the calculated image processing parameters to produce initial color values for the scene image.

18. The scene image of claim 17, wherein the developed scene image signals and the developed patch image signals are generated through front, back, front-through and back-through imaging.

19. The scene image of claim 17 wherein generating signals corresponding to digital representations of the images further comprises:

directing a first illumination source toward a first surface of said film;

capturing radiation reflected from said first surface on a pixel by pixel basis;

assigning a data value to the amount of reflected radiation from said first surface for each pixel to form the front imaging signal;

directing a second illumination source toward a second surface of said film, said second surface and said first surface forming opposite sides of said film;

capturing radiation reflected from said second surface of said film on a pixel by pixel basis;

assigning a data value to the amount of reflected radiation from said second surface for each pixel to form the back imaging signal;

capturing radiation transmitted through said film from said second illumination source on a pixel by pixel basis;

assigning a data value to the amount of transmitted radiation from said first surface for each pixel to form the front-through imaging signal;

capturing radiation transmitted through said film from said first illumination source on a pixel by pixel basis; and s assigning a data value to the amount of transmitted radiation from said second surface for each pixel to form the back-through imaging signal.

20. The scene image of claim 19, wherein processing the digital representations further comprises:

reading the front, back, front-through and back-through signals for reference gray patches;

plotting through channel mean values for each gray reference patch versus front channel mean values to form a first plot;

plotting through channel mean values for each gray reference patch versus back channel mean values to form a second plot;

determining a first equation which best fits the first plot;

determining a second equation which best fits the second plot;

calculating a new data value for each pixel in the front imaging signal based on the first equation; and calculating a new data value for each pixel in the back imaging signal based on the second equation.

* * * * *